(12) United States Patent
Alexander et al.

(10) Patent No.: US 9,383,047 B2
(45) Date of Patent: Jul. 5, 2016

(54) LOCKING DEVICE

(71) Applicant: Viper Subsea Technology Limited, Bristol (GB)

(72) Inventors: Peter Alexander, Wiltshire (GB); Anthony Webb, Somerset (GB)

(73) Assignee: Viper Subsea Technology Limited, Bristol (GB)

( * ) Notice: Subject to any disclaimer, the term of this patent is extended or adjusted under 35 U.S.C. 154(b) by 0 days.

(21) Appl. No.: 14/284,584

(22) Filed: May 22, 2014

(65) Prior Publication Data

US 2014/0353960 A1    Dec. 4, 2014

(30) Foreign Application Priority Data

May 28, 2013 (GB) .................................. 1309487.5

(51) Int. Cl.
 *F16L 15/08* (2006.01)
 *F16L 19/00* (2006.01)
(52) U.S. Cl.
 CPC ............... *F16L 15/08* (2013.01); *F16L 19/005* (2013.01)
(58) Field of Classification Search
 USPC .................................... 285/92, 367, 410, 411
 See application file for complete search history.

(56) References Cited

U.S. PATENT DOCUMENTS

| | | | | |
|---|---|---|---|---|
| 1,284,029 A * | 11/1918 | Adams | ........................... | 411/197 |
| 2,956,818 A * | 10/1960 | Dickerson et al. | ............ | 285/367 |
| 3,797,836 A * | 3/1974 | Halling | ........................... | 285/367 |
| 5,222,768 A * | 6/1993 | Hofer et al. | ...................... | 285/92 |
| 5,312,139 A * | 5/1994 | Marks et al. | ..................... | 285/92 |
| 5,350,201 A | 9/1994 | Bynum | | |
| 5,454,606 A * | 10/1995 | Voss et al. | ..................... | 285/367 |
| 5,466,014 A * | 11/1995 | Cummings | ..................... | 285/92 |
| 5,490,693 A * | 2/1996 | Fisher et al. | .................... | 285/92 |
| 5,524,936 A * | 6/1996 | Barr et al. | ........................ | 285/92 |
| 6,019,558 A | 2/2000 | Warren | | |
| 6,071,035 A * | 6/2000 | McKelvy | ................... | 403/322.2 |
| 6,135,509 A * | 10/2000 | Billington, III | ................. | 285/92 |
| 6,508,613 B2 * | 1/2003 | Cline et al. | ..................... | 408/1 R |
| 6,523,866 B2 * | 2/2003 | Lin | ............................... | 285/367 |
| 6,533,333 B1 * | 3/2003 | Radzik | .......................... | 285/367 |
| 6,652,006 B1 * | 11/2003 | Digiacomo | ..................... | 285/92 |
| 7,341,287 B2 * | 3/2008 | Gibb et al. | ..................... | 285/367 |
| 7,967,343 B2 * | 6/2011 | Bortoli | ............................. | 285/12 |
| 7,980,598 B2 * | 7/2011 | Tsubota et al. | ............... | 285/420 |

FOREIGN PATENT DOCUMENTS

| | | |
|---|---|---|
| EP | 1959180 | 8/2008 |
| GB | 2482723 | 2/2012 |

OTHER PUBLICATIONS

Search Report for GB1309487.5 dated Nov. 21, 2013.
Viper Subsea, The v-secure is the answer to the perennial problem of JIC fittings slackening off in service, https://webs.archive/org/web/20120923043607/http://www.vipersubsea.com/products/v_secure/, dated Sep. 23, 2012.

* cited by examiner

*Primary Examiner* — David E Bochna
(74) *Attorney, Agent, or Firm* — Andrus Intellectual Property Law, LLP

(57) ABSTRACT

A locking device fix a threaded pressure fitting having clamp members, and a clamping load is applied to the clamp members to clamp the clamp members to one another. Each clamp member has a first insert and a second insert held captive thereto, and each insert has a bearing face adapted to cooperate with and bear against part of the pressure fitting, in use, at least the first insert associated with each of the clamp members is angularly moveable relative thereto to permit the bearing face of each first insert to be orientated differently to the bearing face of the associated second insert.

16 Claims, 6 Drawing Sheets

LOCKING DEVICE

CROSS-REFERENCE TO RELATED APPLICATIONS

This application claims priority to British Application No. 1309487.5, filed May 28, 2013, the content of which is incorporated herein by reference in its entirety.

FIELD

This invention relates to a locking device, and more specifically to a locking device used to maintain the integrity of a threaded pressure fitting.

BACKGROUND

A known method of providing a fluid connection is to use a threaded pressure fitting comprising two threaded cooperating parts, wherein tightening the fitting by rotating one part relative to the other results in a seal at a mating interface therebetween. The seal may be formed by compression at a mating interface of the parts of the fitting. One advantage of such fittings is that such connections may be broken by loosening the threaded engagement between the parts, to separate the mating parts of the connection.

A number of different types of threaded pressure fittings exist. One such type of fitting comprises a ferrule which is compressed between a compression nut and pipe when the nut is tightened onto the body of the fitting. Such compression fittings are widely used in compressed air and water connections. A further type of threaded pressure fitting is a flare fitting, in which a flare nut with a female angled surface mates with a corresponding male tapering surface on the body of the fitting. Flare fittings are often used in high pressure systems, or systems requiring a high degree of reliability. Flare fittings may for example be used in aerospace applications and systems carrying potentially hazardous materials such as hydrocarbons (oil, fuel and gas). One industry standard for flare fittings is the Joint Industry Council (JIC) fitting, which has a 37 degree flare mating surface. Other standards for flare pressure fittings include the Aeronautical and Navy (AN) standard and the Society of Automotive Engineers (SAE) standard.

Flare fittings are used extensively in subsea oil and gas development, which generally comprise one or more wells, each having a Christmas tree (often simply referred to as the "tree"). The well tree could more generally be described as a manifold with a plurality of valves to control the flow of the process fluid, which may for example be produced oil or gas from the well, or injected water. The well tree further comprises associated instrumentation to monitor the process fluids. A control system is used to control and monitor the subsea trees, with each tree generally having an associated subsea control module (SCM) mounted on the tree or to a nearby manifold. This control system is controlled from the host facility, typically a fixed or floating oil platform or a floating production storage and offloading (FPSO) facility. The control system is also connected to hydraulic, chemical and electrical feeds from the host facility, which are distributed to each SCM through a network of interconnecting cables and hoses. Typically the hydraulic and chemical hoses are packaged together in bundles with a number of connectors at either hose end being made up simultaneously through the use of a hydraulic stabplate. The interface between the hose connectors and the hoses can be an all-welded construction where the highest levels of reliability is required, but more commonly threaded pressure fittings, such as JIC fittings, are used to allow some reconfiguration or replacement of hoses and connectors in the field without having to can out welding operations which would require the use of specialist equipment and personnel to perform the welding and associated non-destructive testing activities.

A general problem for threaded fittings is the unplanned unfastening or "backing off" of such threaded connections. For example, relative rotation of a connector body and flare nut can result in separation of the flared mating surfaces, resulting in a leak. The connector may unscrew due to vibration of the fitting during transport and/or operation, or as a result of torque applied through hoses (or similar) to one side of the fitting. Helically wound bundles of hydraulic hoses can be particularly problematic, because the application of pressure in the hoses can result in a torque at the fittings.

The consequences of a leaking pressure fitting can be serious. Leaks in vehicle fuel systems may result in fires, and a loss of pressure integrity in a safety critical hydraulic actuation systems (such a vehicle brake system) may endanger life. Leaks in subsea oil and gas development systems can cause pressure in the line to drop significantly and cause a significant loss of fluid to the environment. This loss of pressure or fluid could prevent important hydraulically operated valves from operating completely, leading to consequential environmental damage as well as the loss of safety critical functionality.

It is not possible to use locking washers (or similar) in a compression fitting, since the mating surfaces must engage before any other faces of the fitting and compression/flare nut. In a flare fitting, the flared sealing surface lands out before the adjacent faces of the fitting and flare nut meet.

A known mitigation for this problem is to apply a thread locking compound to the threads before making up the fitting (e.g. Loctite 243). This is not considered good practice in the subsea oil and gas sector due to the potential failure of such materials/compounds in the subsea environment. The compound may also contaminate the sealing surfaces prior to make-up of the fitting, which may create a leak path through the fitting once the compound sets.

Another known method for preventing threaded fittings from backing off is to weld a strip of metal across the nut and body of the fitting after they have been tightened, to mechanically link them. This method is not preferred since it requires a welding operation on a piece of pressure equipment. Such welding operations are difficult to manage and control, are not easily reversed, and the application of heat to the tightened fittings may cause the seal to be broken.

A further known method, used for example in aerospace and motorsport applications, is to use lock wire or safety wire. A hole is provided in a rotatable part of the fitting, (such as a nut) through which the lock wire is threaded, and the lock wire is subsequently wound around a further part (such as the fitting body) so as to prevent backing off of the rotatable parts. This method of securing screw fittings is relatively labour intensive and requires a degree of skill in winding the lock wire to properly constrain rotation. There is also the risk that incorrect installation of the wire with the 'reverse sense' could result in it tending slacken the fitting. The operator this needs to know the direction of lock and further to be able to apply this correctly. Whilst this method may suited to the prevention of complete release of a nut from the associated threads, it does not offer sufficient tightness to prevent leakage which could be due to a fractional degree of movement in high pressure systems.

A need exists for a method and device that enables screw fittings to be prevented from unfastening. Preferably such a method should require a minimum of parts, use only standard tools to assemble and disassemble, and be suitable for re-use. Ideally, the parts should be of minimal cost.

SUMMARY

According to the present invention, there is provided a locking device for a threaded pressure fitting, the locking device comprising first and second clamp members, clamp means operable to apply a clamping load to the first and second clamp members to clamp the first and second clamp members to one another, each clamp member having a first insert and a second insert held captive thereto, each insert having a bearing face adapted to cooperate with and bear against part of the pressure fitting, in use, at least the first insert associated with each of the first and second clamp members being angularly moveable relative thereto to permit the bearing face of each first insert to be orientated differently to the bearing face of the associated second insert.

The first and second clamp members are conveniently hinged or otherwise pivotally connected to one another. The clamp means may take the form of a screw threaded bolt secured, for example pivotally secured, to one of the clamp members, a clamp element, for example in the form of a wing nut or other screw threaded component, mating with the bolt and being engageable with the other of the clamp members to apply a clamping load to the clamp members. The bolt may be pivotally connected to the associated clamp member.

In an alternative arrangement, two such screw threaded bolts and associated clamp elements may be provided, one of which may be regarded as serving to pivotally connect the clamp members to one another. Such an arrangement may permit use of the invention with relatively large diameter fittings.

Conveniently, each clamp member is of arcuate form, each clamp member preferably defining at least one channel within which the associated inserts are located. The channel is conveniently defined between a pair of side walls formed integrally with the associated clamp member. Where two channels are provided, they are conveniently separated by a removable dividing wall. A projection preferably projects into the channel, and is conveniently received within a groove, slot or opening, for example of arcuate form, provided in the associated first insert. It will be appreciated that such an arrangement facilitates the provision of inserts held captive to the clamp members whilst allowing the aforementioned angular movement to occur.

Preferably, both the first insert and the second insert associated with each clamp member are angularly movable, and held captive by way of a projection of the form outlined hereinbefore.

The projection(s) may be of removable form, to allow introduction or removal of the inserts from the associated clamp member, for example taking the form of a removable screw, roll or spiral pin or the like.

It will be appreciated that such an arrangement is advantageous in that the inserts are held captive to the clamp members, thus handling and use of the locking device is simplified. Furthermore, by arranging for the captive inserts to be angularly movable, the inserts can move to adopt the correct orientation to match the fitting with which the device is being used without requiring skill or effort on the part of the operator.

Preferably, each of the inserts has an outer profile of substantially part cylindrical form, the inserts conveniently having substantially the same diameter as one another.

The bearing face of the first and/or second inserts in each clamp member may be substantially part hexagonal, that is to say the bearing face is matched to one half of the hexagonal profile of the screw fitting part of the pressuring fitting. It may be adapted to be engageable with at least a part of: a JIC flare fitting, a SAE flare fitting, general compression fitting nuts such as twin ferrule compression systems (for example a Parker A-Lok) and/or an AN flare fitting. The locking/latching thread may feature one of a variety of tightening methods such as lying/butterfly nuts or half T-bar, such that the invention is fully operable by hand regardless of environment (such as subsea) or personal protective equipment (such as heavy gloves). It may further feature a nut design that prevents loosening due to vibration, such as a "Nylock" fitting.

Conveniently, each of the inserts is of an electrically conducting material so that, in use, an electrical connection is made with the fitting.

The invention further relates to a method of using the device described hereinbefore to prevent a relative rotation of a first and second part of a threaded pressure fitting. The pressure fitting is part of subsea equipment, for example it may be connected to a coupling of a subsea stabplate.

BRIEF DESCRIPTION OF THE DRAWINGS

The invention will further be described, by way of example, with reference to the accompanying drawings, in which.

DETAILED DESCRIPTION OF THE DRAWINGS

Figure 1:
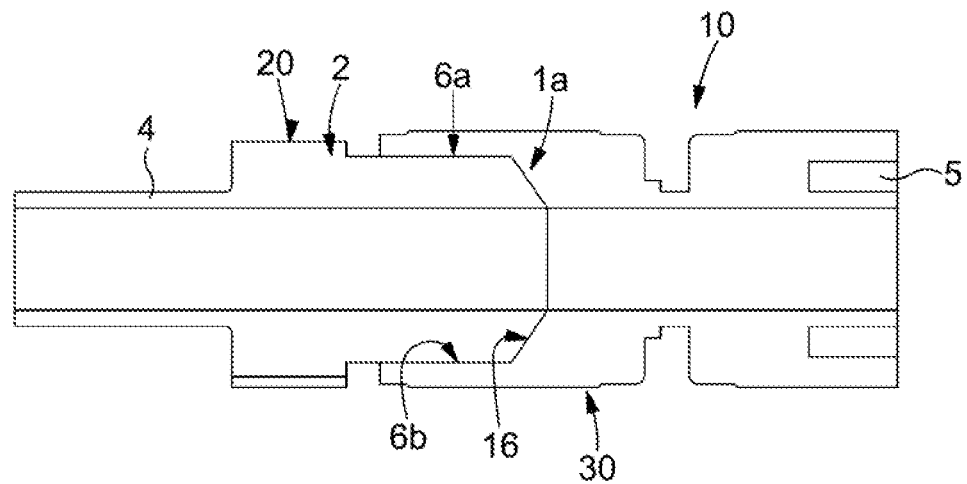
FIG. 1 is a schematic sectional view of a typical flare pressure fitting.
Figure 2:
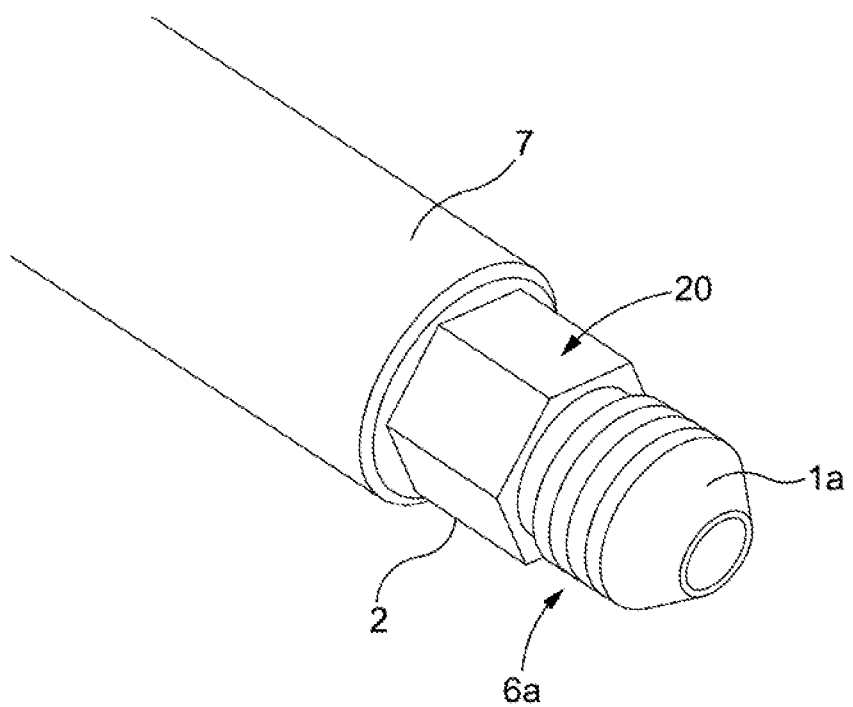
FIG. 2 is a schematic view of a typical flare fitting body.
Figure 3:
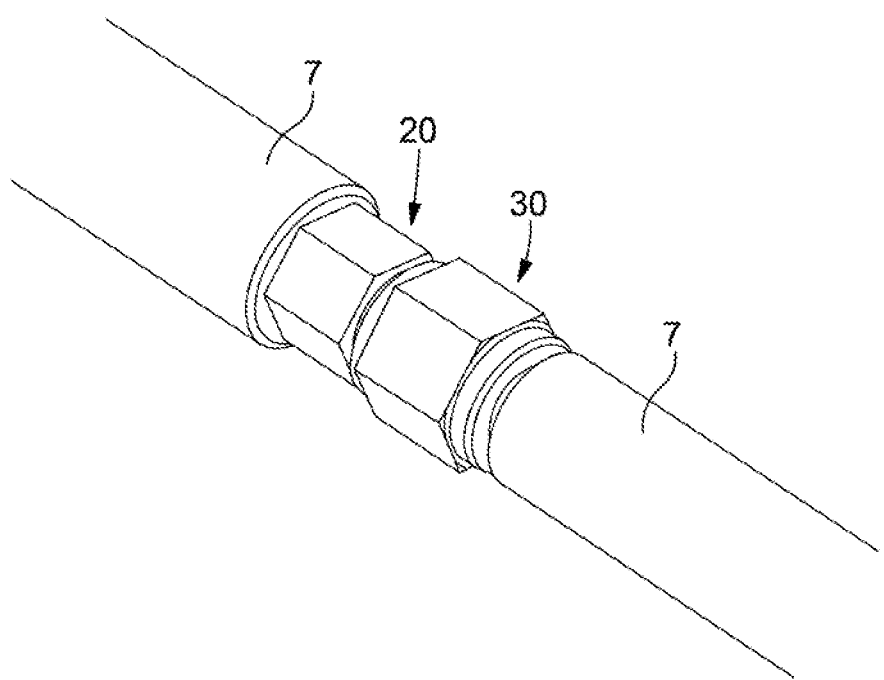
FIG. 3 is a schematic view of an assembled flare fitting.
Figure 4:
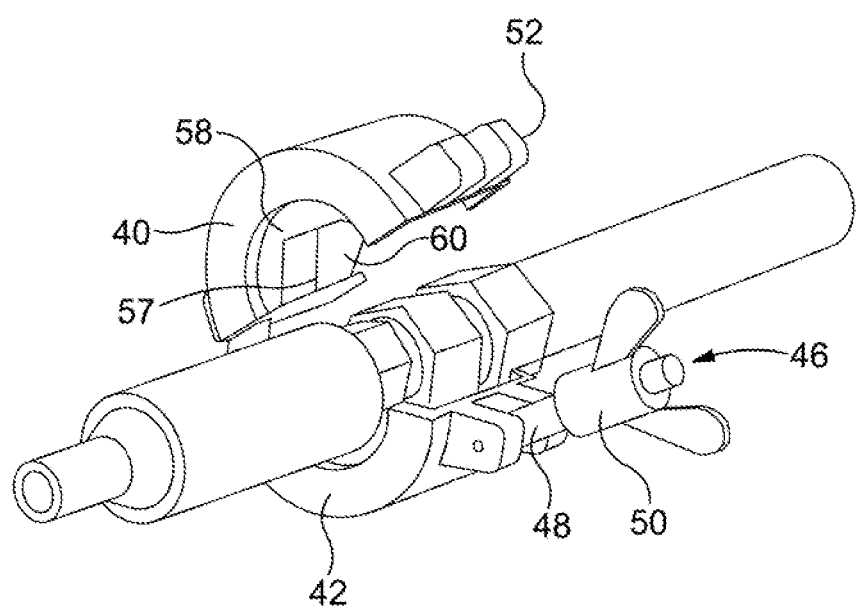
FIGS. 4 to 6 are schematic views of an assembled flare fitting, illustrating stages in the process of fitting the locking device according to an embodiment of the invention thereto.
Figure 5:
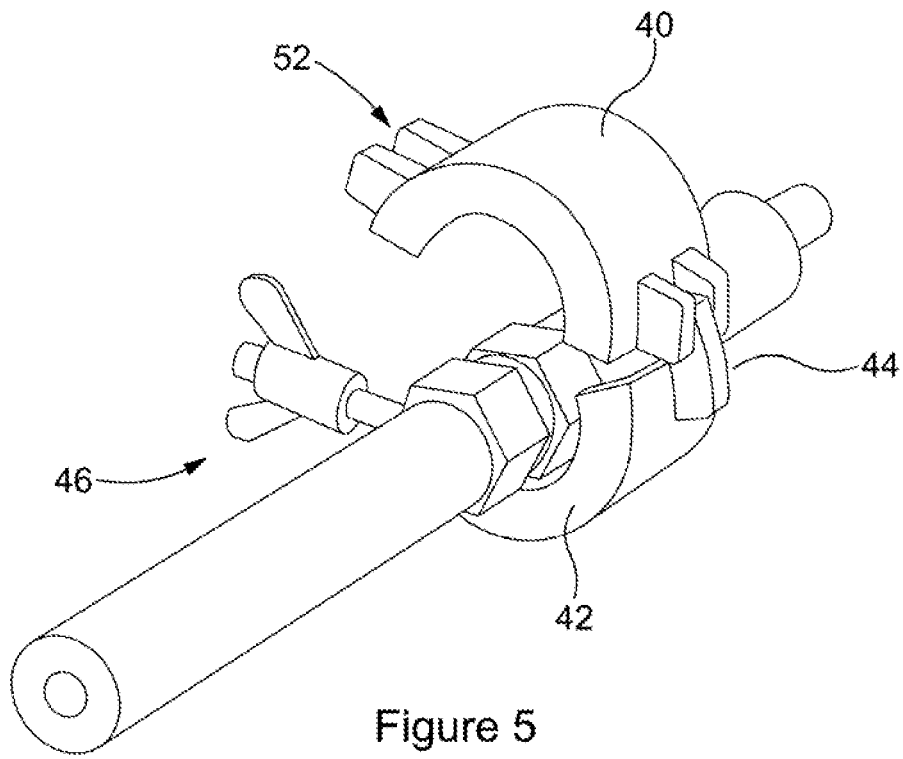

Referring firstly to FIGS. 1 to 3, an example of a pressure fitting 10 is shown, comprising first part 20 and a second part 30. The first part 20, which may be referred to as the fitting body, has a male frusto-conical mating surface 1a, a threaded portion 6a, a hexagonal nut portion 2 and a stub 4. The second part 30, which may be referred to as the fitting nut, has a corresponding female frusto-conical mating surface 1b and threaded portion 6b, as well as a hexagonal nut portion 3 and annular recess 5. In use, the corresponding threaded portions 6a, 6b are screwed together so as to bring the mating surfaces 1a, 1b into sealing engagement. Torque may be applied to or between the fitting body 20 and fitting nut 30 by using a spanner/wrench on the respective hexagonal nut portions 2, 3. The stub 4 and annular recess 5 allow tubing 7 to be welded or brazed to the body 20 and nut 30 respectively. Alternatively, for example, the stub 4 may be connected to a stabplate or similar connector for subsea use. In a further alternative, the predominant design in subsea applications, the stub 4 and parts integral therewith may be an integral part of a hose swage fitting, where the hose is mechanically compressed to the fitting using a swaging tool.

Referring next to FIGS. 4 to 7, a locking device in accordance with an embodiment of the invention is illustrated, the locking device being operable to secure the part 30 of a pressure fitting 10 of the type described hereinbefore against release, unscrewing or backing off from the associated part 20.

Figure 6:
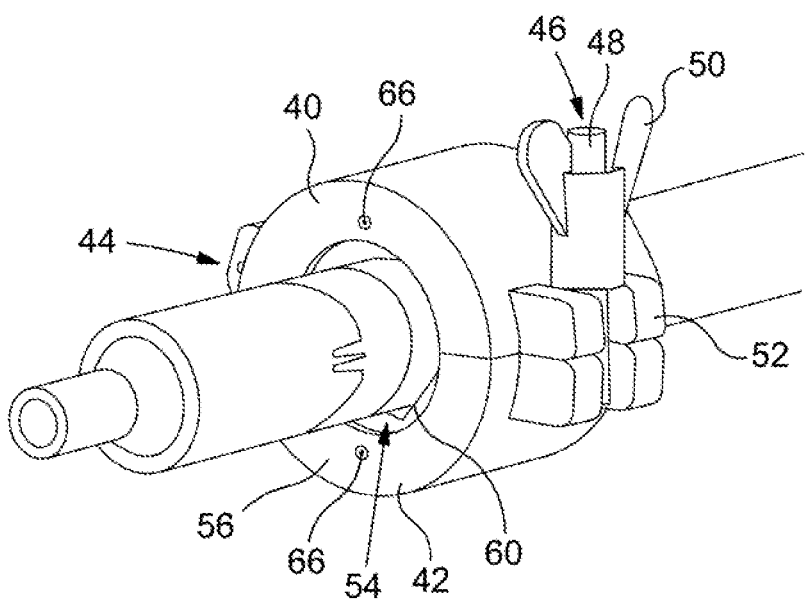
Figure 7:
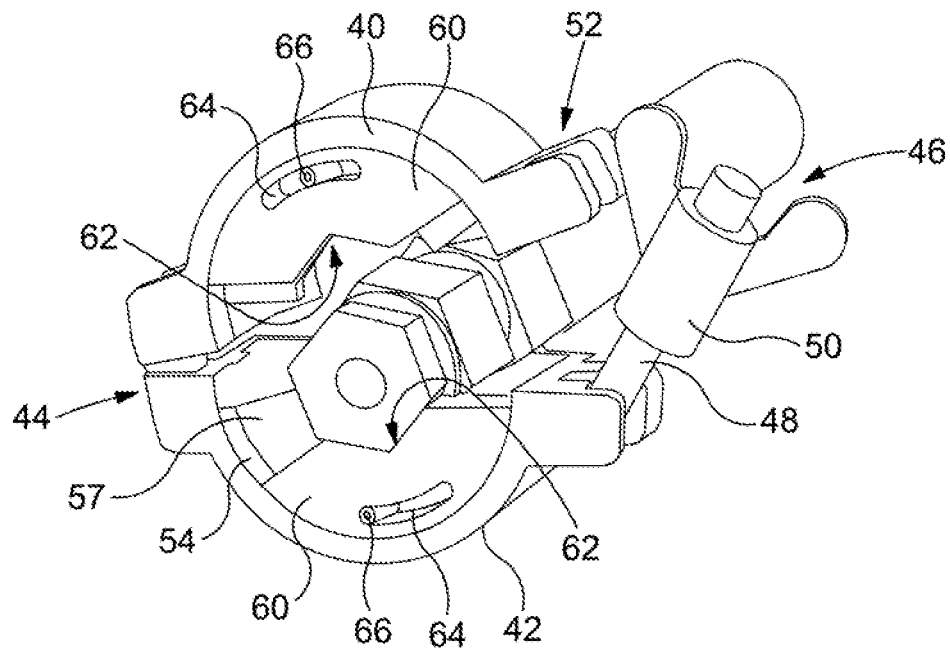
FIG. 7 is a schematic view, partly in section, part of the assembled flare fitting and locking device.
Figure 8:
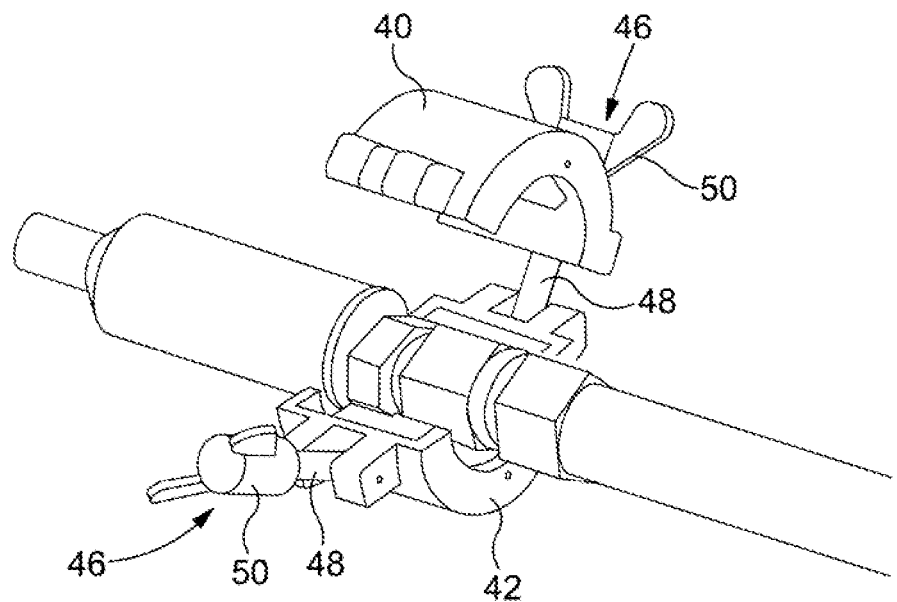
FIGS. 8 to 10 are schematic views of an assembled flare fitting, illustrating stages in the process of fitting the locking device according to another embodiment of the invention thereto.
Figure 9:
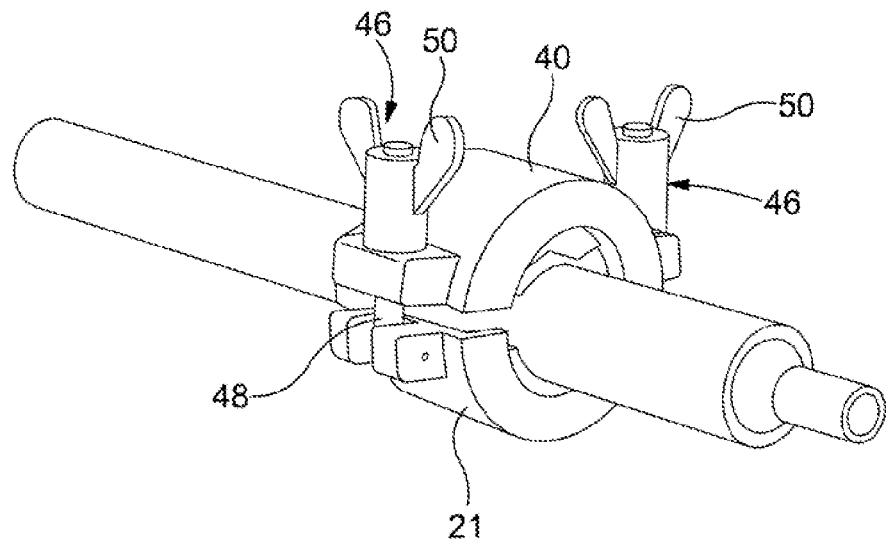
Figure 10:
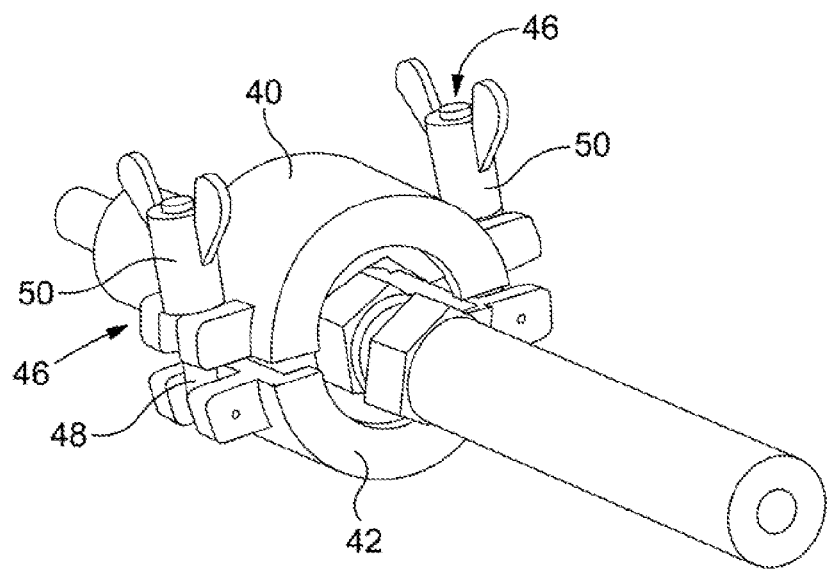
Figure 11:
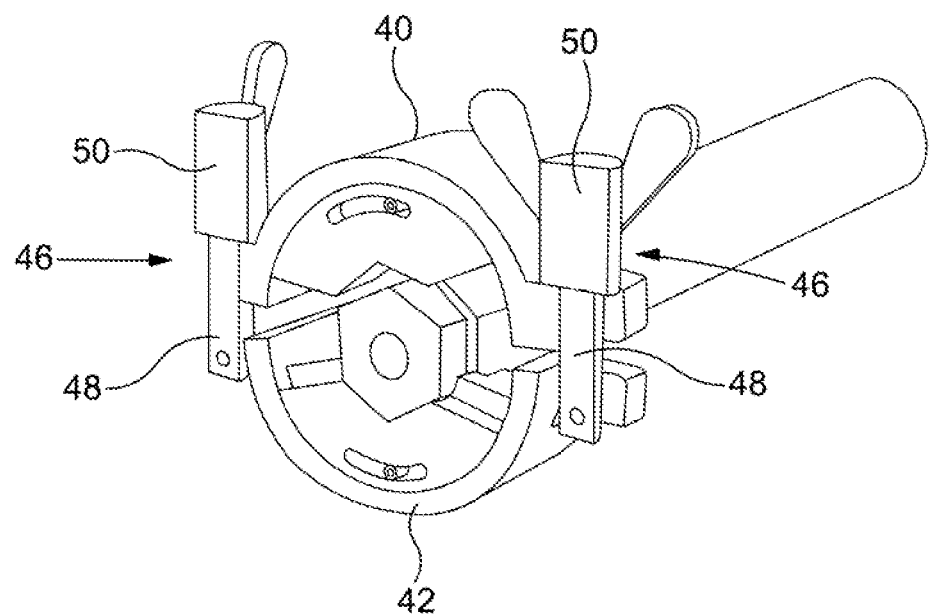
FIG. 11 is a schematic view, partly in section, of part of the arrangement of FIG. 10.

As illustrated in FIGS. 4 to 7, the locking device comprises a first clamp member 40 pivotally connected to a second clamp member 42 by a hinge 44. A clamp means 46 is provided to permit the application of a clamping load to the clamp members 40, 42. In the arrangement illustrated, the clamp means 46 takes the form of a screw threaded bolt 48 pivotally secured to the second clamp member 42 and upon which a wing nut 50 or other screw threaded clamp element is provided. The first clamp member 40 is provided with integral projections 52 with which the nut 50 can engage, as shown in FIG. 6, such that subsequent rotation of the nut 50 can apply a compressive clamping load, urging the clamp members 40, 42 towards one another.

Each clamp member 40, 42 is of arcuate, substantially semi circular form, and defines, on its inner surface, a pair of arcuate channels 54 bounded by side walls 56 formed integrally with the clamp members 40, 42 and by a dividing wall 57. Within the channels 54 are located, respectively, a first insert 58 and a second insert 60. Each insert 58, 60 includes an outer wall of part cylindrical shape, the radius of curvature of which substantially matches that of the associated channel 54. It will be appreciated that each insert 58, 60 is thus able to occupy a range of angular orientations within the associated channel 54, and that the adjacent first and second inserts 58, 60 associated with each clamp member 40, 42 can occupy different angular positions to one another.

Each insert 58, 60 is provided, on its inner surface, with a bearing face 62 shaped to cooperate with the outer profile of the adjacent part of the fitting 10. The bearing face 62 of each first insert 58 takes the form of a recess shaped to cooperate with the hexagonal outer profile of the first part 20 of the fitting, whilst the bearing face 62 of each second inset takes the form of a recess shaped to cooperate with the hexagonal outer profile of the second part 30 of the fitting 10. Whilst in this arrangement, the bearing faces 62 both take the form of recesses adapted to cooperate with parts of hexagonal shaped fittings, it will be appreciated that the invention is not restricted in this regard, and that the bearings faces 62 may take a number of alternative forms, depending upon the nature of the fittings 10 with which the device is used.

Each insert 58, 60 is provided with an arcuate slot 64 which receives an end part of a roll or spiral pin 66, or the like fitted to a respective one of the end walls 56. It will be appreciated that the engagement of the roll or spiral pin 66 within the associated slot 64 serves to limit the range of angular movement of the associated insert 58, 60, serving in combination with the end was 56 to hold the inserts 58, 60 captive within the channels 54 of the clamp members 40, 42. The roll or spiral pin 66 serves to limit the range of angular movement, but does not resist movement within the permitted range.

In use, once a fitting 10 for example of the type shown in FIGS. 1 to 3 has been made up, the locking device can be used to lock the fitting 10 against movement. This is achieved by positioning one of the clamp members 40, 42 against the fitting 10, with bearing faces 62 of the first and second inserts 58, 60 bearing against, respectively, the first and second parts 20, 30 of the fitting 10. The dividing wall 57 is located between the first and second parts 20, 30, thereby ensuring that the inserts 58, 60 are engaged with respective ones of the first and second parts 20, 30, avoiding both inserts 58, 60 hearing against the same one of the parts 20, 30. Depending upon the orientation of the first and second parts 20, 30, the first and/or second inserts 58, 60 may need to move, angularly, within the respective channel 54 in order for this position to be achieved, but as the inserts 58, 60 are free to move, within the limited range of movement defined by the cooperation of the roll or spiral pin 66 within the associated slot 64, the inserts 58, 60 will move to the required angular positions simply as a result of the operator pushing the clamp member against the fitting 10. Once this position has been attained, the other of the clamp members 40, 42 can be moved to bring the inserts 58, 60 thereof similarly into engagement with the fitting 10. Again, the angular orientations of the inserts 58, 60 will self-adjust to the required orientations. The clamp members 40, 42 are then clamped to one another by positioning the bolt 48 and nut 50 such that the nut 50 bears against the projections 52, and by tightening the nut 50.

It will be appreciated that once the clamp members 40, 42 have been clamped to one another in this fashion, the engagement of the inserts 58, 60 with the parts 20, 30 of the fitting 10, and the frictional loadings between the inserts 58, 60 and the clamp members 40, 42 are such that the parts 20, 30 of the fitting 10 are locked against relative rotation. Undesired unscrewing, backing off or the like of the fitting 10 can thus be resisted.

As described above, the various components parts of the locking device are all held captive to one another, thus handling of the device is relatively simple. Furthermore, as the inserts 58, 60 are free to move to self-adjust the orientations thereof to match the parts 20, 30 of the fitting, the operation of installing the device is relatively simple and quick to undertake.

If desired, the outer surfaces of the inserts 58, 60 and/or inner surfaces of the clamp members 40, 42 may be provided with surface textures to assist in resisting rotation of the inserts 58, 60 relative to the clamp members 40, 42 once the clamping load has been applied.

Although in the description hereinbefore the clamp means takes the form of a threaded bolt and nut, it will be appreciated that a wide range of other clamping means could be used without departing from the scope of the invention. By way of example, an over-centre mechanism could be used to apply the clamping load, resulting in a device which is quick and simple to apply. Further, as mentioned hereinbefore, a range of alternatives to the use of wing nuts are available.

Whilst in the description hereinbefore reference is made to each clamp member 40, 42 including a pair of channels 54, it may be possible to provide a single channel 54 which accommodates both of the associated inserts 58, 60, but it will be appreciated that in such an arrangement additional care may be required in the installation process to ensure that the device is properly engaged with both parts 20, 30 of the fitting 10.

To configure the device for use with different fittings, or different sizes of fittings, the rolls or spiral pins 66 are removed and the inserts 58, 60 and, if desired, the dividing wall 57, are replaced with different, appropriated shaped and sized components, before refitting of the rolls or spiral pins 66.

An alternative embodiment of the invention is shown in FIGS. 8 to 11. This embodiment is similar to the embodiment described hereinbefore and only the differences therebetween are described in detail. In the arrangement of FIGS. 8 to 11, instead of providing a hinge 44 interconnecting the clamp members 40, 42, a pair of bolts 48, nuts 50 and associated projections 52 are provided to couple and clamp the clamp members 40, 42 to one another. One of the projections 52 defines an opening through which the associated bolt 48 extends. This bolt and nut thus serves to pivotally connect the clamp members 40, 42 to one another. It is thought that this arrangement will allow the use of the invention with fittings of relatively large dimensions.

In some embodiments, all of the elements of the locking device may be electrically conducting, and in use held firmly in electrical contact with both each other and the fitting, thereby ensuring that the host structure cathodic corrosion protection is shared by the locking device without the need for wires.

Although the device is particularly suitable for applications in the oil and gas sector (such as subsea stabplates), its use is not so restricted.

Example embodiments have been described in which the first and second clamp members 40, 42 have a substantially semi-cylindrical external profile. Although this feature is advantageous due to the profile of the inner half-sleeves, it is not necessary for the invention, and housings with other profiles (such as square) may also be used, and may be more appropriate for different clamping arrangements.

A locking device has been disclosed that enables industry standard pressure fittings to be secured against inadvertent loosening. The locking device is relatively low cost, removable, and is straightforward to fit with no tools required. The invention addresses a significant problem in the oil and gas sector that is particularly relevant for threaded fittings that are exposed to high levels of vibration, and fittings for helically wound bundles of hydraulic hoses. It is simple to fit, and accommodates fittings of different sizes, simply by using internal sleeves with appropriately sized internal profiles. It does not require movement of parts of the fitting to predetermined positions to allow operation thereof, and does not result in the application of loadings to the fitting which could result in the fitting being loosened. Furthermore, due to the design of the embodiments described above, being assembled as a one-piece device, it is particularly suited to environments where the use of tools or handling of multiple parts during assembly is undesirable and it is not possible to slide any circular elements on to the hoses prior to connection of the pressure fitting, such as in retrofitting the invention to an already-connected hose fitting. One such example is its use subsea by a diver wearing gloves—the coordination of locating the invention on to the hose fittings and then tightening it up is greatly eased by a one-piece design and the provision of manually tightenable fixtures.

Whilst specific embodiments of the invention are described hereinbefore, it will be appreciated that a number of modifications and alterations may be made thereto without departing from the scope of the invention as defined by the appended claims.

The invention claimed is:

1. A locking device for a threaded pressure fitting, the locking device comprising first and second clamp members, clamp means operable to apply a clamping load to the first and second clamp members to clamp the first and second clamp members to one another, each clamp member having a first insert and a second insert held captive thereto, the first inserts being axially aligned with one another and the second inserts being axially aligned with one another, the first inserts being axially spaced from the second inserts, each insert having a bearing face adapted to cooperate with and bear against part of the pressure fitting, in use, at least the first insert associated with each of the first and second clamp members being angularly moveable relative thereto to permit relative angular movement between the first and second inserts such that the bearing face of each first insert is permitted to be orientated differently to the bearing face of the associated second insert, wherein the first inserts and the second inserts are held captive to each clamp member prior to attachment of the locking device to the threaded pressure fitting, during attachment of the locking device to the threaded pressure fitting and after attachment of the locking device to the threaded pressure fitting.

2. The device according to claim 1, wherein the first and second clamp members are hinged or otherwise pivotally connected to one another.

3. The device according to claim 2, wherein the clamp means comprises a screw threaded bolt secured to one of the clamp members, and a clamp element mating with the bolt and being engageable with the other of the clamp members to apply a clamping load to the clamp members.

4. The device according to claim 3, wherein the bolt is pivotally connected to the associated clamp member.

5. The device according to claim 1, wherein the clamp means comprises pair of a screw threaded bolts, each secured to one of the clamp members, and clamp elements mating with the bolts and being engageable with the other of the clamp members to apply a clamping load to the clamp members, one of the bolts extending through an opening provided in the said other of the clamp members.

6. The device according to claim 1, wherein each clamp member is of arcuate form.

7. The device according to claim 1, wherein each of the inserts has an outer profile of substantially part cylindrical form, the inserts having substantially the same diameter as one another.

8. The device according to claim 1, wherein the bearing face of the first and/or second inserts in each clamp member are of substantially part hexagonal form, each being matched to one half of the hexagonal profile of a screw fitting part of the pressuring fitting.

9. The device according to claim 1, wherein each of the inserts is of an electrically conducting material.

10. A locking device for a threaded pressure fitting, the locking device comprising first and second clamp members, clamp means operable to apply a clamping load to the first and second clamp members to clamp the first and second clamp members to one another, each clamp member having a first insert and a second insert held captive thereto, the first inserts being axially aligned with one another and the second inserts being axially aligned with one another, the first inserts being axially spaced from the second inserts, each insert having a bearing face adapted to cooperate with and bear against part of the pressure fitting, in use, at least the first insert associated with each of the first and second clamp members being angularly moveable relative thereto to permit relative angular movement between the first and second inserts such that the bearing face of each first insert is permitted to be orientated differently to the bearing face of the associated second insert, wherein each clamp member defines at least one channel within which the associated inserts are located.

11. The device according to claim 10, wherein the channel is defined between a pair of side walls, at least one of which is formed integrally with the associated clamp member.

12. The device according to claim 11, wherein a pair of channels is provided, the channels being separated from one another by a removable dividing wall.

13. The device according to claim 10, wherein a projection projects into the channel, and is received within a groove, slot or opening provided in the associated first insert.

14. The device according to claim 13, wherein both the first insert and the second insert associated with each clamp member are angularly movable, and are held captive by way of an associated projection.

15. The device according to claim 13, wherein the projection(s) are removable to allow introduction or removal of the inserts from the associated clamp member.

16. A locking device for a threaded pressure fitting, the locking device comprising first and second clamp members, clamp means operable to apply a clamping load to the first and second clamp members to clamp the first and second clamp members to one another, each clamp member having a first insert and a second insert held captive thereto, the first inserts being axially aligned with one another and the second inserts being axially aligned with one another, the first inserts being axially spaced from the second inserts, each insert having a bearing face adapted to cooperate with and bear against part of the pressure fitting, in use, at least the first insert associated with each of the first and second clamp members being angularly moveable relative thereto to permit relative angular movement between the first and second inserts such that the bearing face of each first insert is permitted to be orientated differently to the bearing face of the associated second insert, wherein the first and second clamp members are hinged or otherwise pivotally connected to one another, and further wherein the clamp means comprises a screw threaded bolt secured to one of the clamp members, and a clamp element mating with the bolt and being engageable with the other of the clamp members to apply a clamping load to the clamp members, and further wherein the bolt is pivotally connected to the associated clamp member.

* * * * *